3,174,936
LITHIUM PERCHLORATE OXYGEN CANDLE

Paul R. Gustafson, Indian Head, and Roman R. Miller, Silver Spring, Md., assignors to the United States of America as represented by the Secretary of the Navy
No Drawing. Filed May 3, 1961, Ser. No. 107,592
5 Claims. (Cl. 252—186)
(Granted under Title 35, U.S. Code (1952), sec. 266)

The invention described herein may be manufactured and used by or for the Government of the United States of America for governmental purposes without the payment of any royalties thereon or therefor.

This invention relates generally to oxygen generating compositions and more particularly to oxygen generating compositions which produce more units of oxygen per unit weight than existing compositions.

The use of chlorate candles for oxygen yielding compositions is known and has been practiced for sometime. The composition of these chlorate candles may vary in some degree as to ingredients or percentages of various ingredients, however, it is the general practice to use sodium chlorate as a basic ingredient in prior candles. The candles presently used are formed by stirring the ingredients together and then moistening with water, pressing in a mold to the desired shape, and thereafter removing from the mold and drying the candle. There are limitations imposed in several steps in the foregoing procedure, mainly in use of the basic oxygen-containing chemical, in the manner or method of combining the ingredients in a mold under pressure, and in the drying process.

The present invention avoids the disadvantages of prior methods of producing chlorate candles, and provides a candle which has a much higher oxygen yield per unit weight and which may be formed without the addition of and in lieu of water. The resulting product is stable, has a higher oxygen yield per weight than previous candles, has a greater density thereby requiring less storaging space, and is formed by a fusion process which eliminates both the time required to dry candles formed while moistened as well as the density imposed by use of water.

Accordingly, it is an object of the present invention, to provide an oxygen source which will yield over 50% of its weight in oxygen.

It is another object of the present invention to provide an oxygen source which has a yield of over 50% of by weight of oxygen and which is stable over exceedingly long periods of time.

It is a further object of the present invention to provide an oxygen source whose yield is over 50% by weight and whose residue is a usable product.

It is a further object of the present invention to provide an oxygen source whose yield is over 50% by weight and which does not require refrigeration, or elaborate containers for storage thereof.

It is a further object of this invention to provide an oxygen source having a yield of over 50% by weight of oxygen which does not require the addition and subsequent removal of water from the ingredients forming the compound.

It is a further object of the present invention to provide a method for forming an oxygen source having a yield of over 50% by weight of oxygen in which the ingredients may be heated evenly throughout thereby producing a uniform compound.

It is a still further object of this invention to provide a method for forming an oxygen source having a yield of over 50% by weight in which the ingredients may be pressed while hot into the desired shape.

Various other objects and advantages will appear from the following description of the embodiment of the invention, and the novel features will be particularly pointed out hereinafter in connection with the appended claims.

Our invention, accordingly, comprises the several steps, and the interrelation of one or more of such steps with respect to each of the others; and the oxygen candles possessing the features, properties, and the relation of elements, which are exemplified in the following detailed disclosure, together with the method of combining the elements into a mass of desired shape and density.

It is well established that chlorate candles containing sodium chlorate mixtures will produce oxygen equal to approximately 41% by weight of the candle. This appears to be the maximum percentage of oxygen which may be obtained from the use of sodium chlorate, and is acceptable under present standards for the commercial production of oxygen for breathing. Where equal volumes of lithium perchlorate and liquid oxygen are considered, it has been determined that 29% more oxygen is obtained from the lithium perchlorate. Where container volumes are included in a comparison, a representative 30-gallon portable liquid oxygen cylinder (height 58, diameter 20 inches) will contain 250 pounds of oxygen, occupy 10.55 cubic feet of space, and weight 460 pounds. An equal 250 pounds of oxygen will be obtained from ten 50-pound lithium perchlorate candles having a density of 2.4 grams per cubic centimeter, a gross weight (including containers) of 520 pounds, and a yield of oxygen of 50% by weight of the perchlorate but the perchlorate and containers will occupy only 3.68 cubic feet of space. There is thus realized a saving of 65% in space through use of lithium perchlorate as a source of oxygen in lieu of liquid oxygen.

The use of lithium perchlorate as the primary ingredient in a chlorate candle has not to our knowledge heretofore been disclosed in combination with the elements listed in Table I. The selection of lithium perchlorate is based primarily on an exceptionally high yield of oxygen, substantially 25% greater than the yield which it is possible to obtain from sodium chlorate. To obtain the substantially higher yield, however, the other ingredients listed in the table are essential.

TABLE I

|  | I | II | III | IV | V |
|---|---|---|---|---|---|
|  | Percent | Percent | Percent | Percent | Percent |
| Boron | 1.8 | 1.5 | 1.65 | 3 | 3 |
| Iron | 2.2 | 1.5 | 1.85 | 1 | 1 |
| $BaO_2$ | 4 | 8 | 6.50 | 4 | |
| Fiber | 3 | 4 | 3 | 4 | 4 |
| $LiClO_4$ | 89 | 85 | 87 | 88 | 93 |
| $O_2$ yield | 50.5 | 48 | 49 | 46 | 48.5 |

The mixtures listed in columns I, II, and III produce heat upon decomposition such that insulation is required around the container or burner. The barium peroxide is a catalyst and the percentages specified in Table I of barium peroxide include approximately ½ to 1% of a secondary catalyst which is added to improve the ignition power of the candle. The secondary catalyst may be any of several compounds such as $Ag_2O$, Cu metal, Ag metal, $Cu_2O$ (red), $K_2Cr_2O_3$ and other chromates $MnO_2$, Zn, $ZnO_2$ (pink lattice deficient, and $ZnO_2$ (white). Silver oxide may be dangerous if careful selection is not made of the other ingredients combined with it. The fiber specified as an ingredient in each of the columns may be any inert filler such as glass, asbestos, and so forth. Copper metal fiber may also be used and has the particular advantage of exerting a catalytic effect upon the decomposition of the candle.

Amorphous boron was used in the compositions listed in Table I as a fuel for producing oxygen from the compound. Boron is considered an essential element where the maximum yield of oxygen is desired. The other catalysts listed are also essential for maximum yield, however, since without them the quantity of boron necessary would have to be increased thereby reducing the oxygen yield. Catalysts in addition to boron are, of course, iron and barium oxide and possibly copper metal where the copper is used to replace the fiber listed. The heat of combustion of boron is considerably higher than that of iron so that for a given weight of either of these one would obtain a larger amount of heat from the boron for fueling the combustion of the perchlorate. Thus a smaller amount of boron can be used which lowers the weight of the candle and makes it more efficient where weight is a critical factor as in space vehicles. That is, for equal weights of iron and boron, the boron will provide eight times the amount of heat.

The mixtures specified in Table I may be heated by ordinary conduction means or may be heated by insertion in the field of an induction coil to substantially the melting point of lithium perchlorate, namely 236° C., and pressed at that temperature. Although various heating methods may be used, it has been found that heating by induction requires approximately four minutes while other means will take in the vicinity of about one hour or more. In heating by induction, the mixture can be contained in a glass fiber sock which is clamped at the lower end and inserted in a coil, in the present embodiment the coil of a standard 10-kilowatt output RF generator. A more even distribution of heat can be obtained by inserting a tube of stainless steel or similar material in the sock or other container so as to shape the mixture into a thick-walled tubular configuration. In such configuration, heat is vented through the tube and a more even distribution of the magnetic field through the mixture is obtained. As stated previously, heating by induction requires substantially less time than other methods of heating, while the use of a glass sock permits rapid transfer from the heating means to a die or other means for forming the desired shape without attendant lowering of temperature or loss of time.

Although catalysts such as barium peroxide and iron have received general use in the production of existing chlorate candles, the introduction of boron as a catalyst is an advance over prior methods and helps to provide the exceptionally high oxygen yield obtained from the lithium perchlorate candles of the present invention. However, the boron must be combined with other catalysts in the general proportions specified to obtain very high oxygen yields.

The relative porportions of the lithium perchlorate vary between 85 percent and 93 percent by weight of the composition. Our method of preparing a candle, and the preferred composition thereof, are given in detail in the following example.

*Example*

The preferred embodiment of the present invention is a lithium perchlorate candle containing 89 parts by weight of lithium perchlorate mixed with 2.2 parts of powdered iron, 3 parts of fiber, 4 parts by weight of barium peroxide, and 1.8 parts by weight of amorphous boron. The dry ingredients are mixed thoroughly and preferably heated in an induction coil, however, they may also be heated slowly in an iron retort with care being taken at all times to keep the mass at a substantially uniform temperature throughout by agitating, stirring and cutting material loose from the side walls of the retort. The mass is heated to the melting point of lithium perchlorate, 236° C., or a few degrees above that temperature. When plastic, the mass, which at this temperature is a thick mixed fluid, is quickly pressed into dies or other forms and allowed to set into solid candles in the desired shape. To obtain a high yield it is essential to use lithium perchlorate as the source of oxygen. Although lithium chlorate has been considered as the oxygen supply and rejected as to deliquescence, the basis for rejection does not apply to lithium perchlorate. With the use of lithium perchlorate, a product of the reaction is lithium chloride which is a dehydrating agent and is a usable by-product where the humidity in an area is desired to be reduced. It is emphasized however, that the selection of lithium perchlorate is based upon its high yield in comparison with other oxygen compounds and not upon the use to which the residue may be put.

In heating the mixture, it is essential that heating be carried only slightly beyond the point at which the mixture melts sufficiently to pour. Substantial heating beyond this point may produce undesired decomposition. While column I of Table I lists the mixture giving the highest yield of oxygen, that is 50.5%, and comprises the following elements: boron—1.8%; iron—2.2%; barium peroxide—4%; fiber—3%; lithium perchlorate—89%. It is possible to obtain a yield as high as 56% to 57% by weight of oxygen through a careful selection of catalysts, fiber and perchlorate percentages.

Our invention demonstrates the feasibility of lithium perchlorate as an oxygen source for closed atmospheric systems where prior investigations have reached the conclusion that lithium chlorate, at least, is not desirable. We have demonstrated that not only is lithium perchlorate usable but that it will produce a mixture having a greater yield than that of any prior material of which we have knowledge. The lithium perchlorate candle produced in accordance with the foregoing description is a very stable compound and may be stored in containers for lengthy periods without deterioration or decomposition. The lithium perchlorate mixture may be heated by induction or diathermy as by conduction in a retort, and can be extruded if desired. The lithium perchlorate candle is preferable to liquid oxygen in that it may be stored for a long term for emergency use whereas liquid oxygen requires the use of special containers and the observance of special precautions in the storage of such containers. Further, the present lithium perchlorate candle will produce at least 50% of its weight in oxygen while pressed to a crystal density of 2.5 grams per centimeter; 1¼ grams of oxygen will be obtained per cubic centimeter of candle mix. In comparison with this yield, one cubic centimeter of liquid oxygen will produce 1.14 grams of oxygen, a deficiency of .09 in grams per cubic centimeter of compound which, when assessed against the difficulty of preparing and storing liquid oxygen, demonstrates the superiority of lithium perchlorate candles as an oxygen supply. Other compositions listed in Table I will also provide a superior amount of oxygen to existing chlorate candles and may have individual advantages one over the other.

The candle fuse is of the same material as the candle, however the quantities are selected to give a faster burning mixture and one that is readily ignited with a phosphorous scratcher. When ignited, the lithium perchlorate candle burns at a rate which is comparable to the burning rate of sodium chlorate candles and is uniform as well. The candles may be made in various sizes for use in a variety of locations such as an emergency source of oxygen in aircraft, or submarines, for emergency use by physicians where oxygen therapy is desired, for use in portable welding apparatus, and for other similar uses.

Chlorine or oxychlorine such as $Cl_2O$ is produced in all of the compositions listed, with mixture II producing the lowest concentration. Mixture II also tends to burn without excessive melting, however, mixture III gives the highest yield of oxygen when all factors, i.e., melting (during combustion), chlorine, ignitability, etc., are considered. It is believed the chlorine can be effectively eliminated by passing the evolved $O_2$ through a main conventional $CO_2$ absorber or through $Na_2S_2O_3$, etc.

The high cost of lithium perchlorate may affect its desirability in some areas of possible use. But where cost is not a factor, the lithium perchlorate candle is a superior source of oxygen to existing candles, and, in the compositions disclosed or in other similar compositions, provides a source of oxygen having the highest yield yet produced. Obviously many modifications and variations of the present invention are possible in the light of the above teachings. It is therefore to be understood that within the scope of the appended claims the invention may be practiced otherwise than as specifically described.

What is claimed is:

1. A solid composition capable of yielding oxygen on combustion which consists essentially of from about 85 to 93 percent by weight of solid fused lithium perchlorate containing dispersed therein from about zero to 6.5 percent by weight of barium peroxide, from about 1 to 2.2 percent by weight of finely divided iron, from about 1.5 to 3 percent by weight of finely divided boron and from about 3 to 4 percent by weight of asbestos fiber.

2. A solid composition capable of yielding oxygen on combustion which consists essentially of about 89 percent by weight of lithium perchlorate, 4 percent by weight of barium peroxide, 1.8 percent by weight of boron, 2.2 percent by weight of iron, and 3 percent by weight of copper metal fiber.

3. A solid composition capable of yielding oxygen on combustion which consists essentially of about 85 percent by weight of lithium perchlorate, 8 percent by weight of barium peroxide, 1.5 percent by weight of boron, 1.5 percent by weight of iron, and 4 percent by weight of inert filler.

4. The method of preparing a fused, undecomposed perchlorate candle having a yield of substantially 50 percent by weight of oxygen comprising placing a mixture of ingredients as defined in claim 2 in a container adapted to fit within an induction coil, inserting a core of ferrous material within said mixture so as to more evenly space magnetic lines of force therein, energizing said induction coil whereby said mixture will be heated to its plastic point by passage therethrough of said magnetic lines of force, and while in plastic condition pressing the mass into the desired form.

5. A solid composition capable of yielding oxygen on combustion which consists essentially of from about 85 to 93 percent by weight of lithium perchlorate containing dispersed therein from about zero to 6.5 percent by weight of barium peroxide, from about 1 to 2.2 percent by weight of finely divided iron, from about 1.5 to 3 percent by weight of finely divided boron and from about 3 to 4 percent by weight of non-combustible fiber, said composition forming a dehydrating agent, lithium chloride, as a product of the combustion.

References Cited by the Examiner
UNITED STATES PATENTS

| | | | |
|---|---|---|---|
| 2,410,801 | 11/46 | Audrieth | 149—22 XR |
| 2,469,414 | 5/49 | Schechter | 252—187 |
| 2,775,511 | 12/56 | Geffroy et al. | 252—187 XR |
| 2,988,438 | 6/61 | Allovio | 149—22 XR |
| 3,027,283 | 3/62 | Bice | 149—22 XR |

ALBERT T. MEYERS, *Primary Examiner.*

JULIUS GREENWALD, *Examiner.*